(12) United States Patent
Jain et al.

(10) Patent No.: US 11,611,613 B2
(45) Date of Patent: Mar. 21, 2023

(54) POLICY-BASED FORWARDING TO A LOAD BALANCER OF A LOAD BALANCING CLUSTER

(71) Applicant: VMware, Inc., Palo Alto, CA (US)

(72) Inventors: Jayant Jain, Cupertino, CA (US); Anand Parthasarathy, Fremont, CA (US); Mani Kancherla, Cupertino, CA (US); Anirban Sengupta, Saratoga, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/938,733

(22) Filed: Jul. 24, 2020

(65) Prior Publication Data
US 2022/0030060 A1    Jan. 27, 2022

(51) Int. Cl.
*H04L 67/1023*    (2022.01)
*H04L 47/20*    (2022.01)
(Continued)

(52) U.S. Cl.
CPC ...... *H04L 67/1023* (2013.01); *H04L 12/4633* (2013.01); *H04L 12/66* (2013.01); *H04L 47/20* (2013.01); *H04L 2101/622* (2022.05)

(58) Field of Classification Search
CPC .............. G06F 9/5083; H04L 12/4633; H04L 12/4641; H04L 12/66; H04L 41/0893;
(Continued)

(56) References Cited

U.S. PATENT DOCUMENTS 5,504,921 A    4/1996    Dev et al.
5,550,816 A    8/1996    Hardwick et al.
(Continued)

FOREIGN PATENT DOCUMENTS

EP    1653688 A1    5/2006
EP    2882151 A1    6/2015
(Continued)

OTHER PUBLICATIONS

Casado, Martin, et al., "Virtualizing the Network Forwarding Plane," Dec. 2010, 6 pages.
(Continued)

*Primary Examiner* — Jeffrey R Swearingen
(74) *Attorney, Agent, or Firm* — Adeli LLP

(57) ABSTRACT

Some embodiments of the invention provide a method for forwarding data messages between a client and a server (e.g., between client and server machines and/or applications). In some embodiments, the method receives a data message that a load balancer has directed from a particular client to a particular server after selecting the particular server from a set of several candidate servers for the received data message's flow. The method stores an association between an identifier associated with the load balancer and a flow identifier associated with the message flow, and then forwards the received data message to the particular server. The method subsequently uses the load balancer identifier in the stored association to forward to the particular load balancer a data message that is sent by the particular server. The method of some embodiments is implemented by an intervening forwarding element (e.g., a router) between the load balancer set and the server set.

20 Claims, 6 Drawing Sheets

(51) Int. Cl.
*H04L 12/66* (2006.01)
*H04L 12/46* (2006.01)
*H04L 101/622* (2022.01)

(58) Field of Classification Search
CPC ....... H04L 45/38; H04L 45/54; H04L 45/745; H04L 47/125; H04L 47/20; H04L 61/103; H04L 61/2592; H04L 61/6022; H04L 67/10; H04L 67/1002; H04L 67/1023; H04L 67/1027; H04L 67/2814; H04L 67/42; H04L 69/22
See application file for complete search history.

(56) References Cited

U.S. PATENT DOCUMENTS

| | | |
|---|---|---|
| 5,751,967 A | 5/1998 | Raab et al. |
| 6,006,275 A | 12/1999 | Picazo et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,302,484 B1 | 11/2007 | Stapp et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Merwe et al. |
| 8,958,298 B2 | 2/2015 | Zhang et al. |
| 9,059,999 B2 | 6/2015 | Koponen et al. |
| 10,063,458 B2 | 8/2018 | Zhang et al. |
| 10,212,071 B2 | 2/2019 | Kancherla et al. |
| 10,693,763 B2 | 6/2020 | Zhang et al. |
| 10,742,746 B2 | 8/2020 | Kancherla et al. |
| 10,826,827 B1 | 11/2020 | Natal et al. |
| 11,095,480 B2 | 8/2021 | Natarajan et al. |
| 2001/0043614 A1 | 11/2001 | Viswanadham et al. |
| 2002/0093952 A1 | 7/2002 | Gonda |
| 2002/0186705 A1 * | 12/2002 | Kadambi ............. H04L 49/901 370/452 |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0179742 A1 | 9/2003 | Ogier et al. |
| 2003/0225857 A1 | 12/2003 | Flynn et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0189769 A1 | 8/2008 | Casado et al. |
| 2008/0225853 A1 | 9/2008 | Melman et al. |
| 2008/0240122 A1 | 10/2008 | Richardson et al. |

(56) References Cited

U.S. PATENT DOCUMENTS

| | | |
|---|---|---|
| 2008/0253366 A1 | 10/2008 | Zuk et al. |
| 2008/0263205 A1* | 10/2008 | Naseh .................. H04L 61/2514 709/226 |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0175125 A1 | 7/2010 | McDysan |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0110374 A1 | 5/2011 | Boucadair et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0145390 A1 | 6/2011 | Kakadia et al. |
| 2011/0194567 A1 | 8/2011 | Shen |
| 2011/0202675 A1* | 8/2011 | Faulk, Jr. ............ H04L 63/0428 709/238 |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0039338 A1 | 2/2012 | Morimoto |
| 2012/0066371 A1* | 3/2012 | Patel .................. H04L 67/1031 709/224 |
| 2012/0096159 A1 | 4/2012 | Short et al. |
| 2012/0099591 A1* | 4/2012 | Kotha .................. H04L 45/54 370/392 |
| 2012/0131643 A1 | 5/2012 | Cheriton |
| 2012/0144014 A1* | 6/2012 | Natham ............... H04L 67/1002 709/224 |
| 2012/0173757 A1 | 7/2012 | Sanden |
| 2012/0182992 A1 | 7/2012 | Cowart et al. |
| 2012/0236734 A1 | 9/2012 | Sampath et al. |
| 2012/0278802 A1 | 11/2012 | Nilakantan et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0058346 A1 | 3/2013 | Sridharan et al. |
| 2013/0070745 A1 | 3/2013 | Nixon et al. |
| 2013/0089097 A1 | 4/2013 | Filsfils et al. |
| 2013/0125120 A1 | 5/2013 | Zhang et al. |
| 2013/0142048 A1 | 6/2013 | Gross, IV et al. |
| 2013/0145002 A1 | 6/2013 | Kannan et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0201989 A1* | 8/2013 | Hu .................. H04L 47/125 370/392 |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0329548 A1 | 12/2013 | Nakil et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0195666 A1 | 7/2014 | Dumitriu et al. |
| 2014/0207968 A1* | 7/2014 | Kumar .................. H04L 45/64 709/244 |
| 2014/0310418 A1* | 10/2014 | Sorenson, III ...... H04L 67/1002 709/226 |
| 2015/0063364 A1 | 3/2015 | Thakkar et al. |
| 2015/0103838 A1 | 4/2015 | Zhang et al. |
| 2015/0117454 A1 | 4/2015 | Koponen et al. |
| 2015/0189009 A1 | 7/2015 | Bemmel |
| 2015/0263946 A1 | 9/2015 | Tubaltsev et al. |
| 2015/0271303 A1 | 9/2015 | Neginhal et al. |
| 2016/0142257 A1 | 5/2016 | Udupi et al. |
| 2016/0198003 A1 | 7/2016 | Luft |
| 2016/0226762 A1 | 8/2016 | Zhang et al. |
| 2016/0335107 A1 | 11/2016 | Behera et al. |
| 2016/0380812 A1 | 12/2016 | Chanda et al. |
| 2017/0317954 A1 | 11/2017 | Masurekar et al. |
| 2018/0062923 A1 | 3/2018 | Katrekar et al. |
| 2018/0063231 A1 | 3/2018 | Park |
| 2018/0176124 A1 | 6/2018 | Kancherla et al. |
| 2018/0176307 A1 | 6/2018 | Kancherla et al. |
| 2019/0014032 A1 | 1/2019 | Zhang et al. |
| 2019/0020580 A1 | 1/2019 | Boutros et al. |
| 2019/0104413 A1 | 4/2019 | Cidon et al. |
| 2019/0173757 A1 | 6/2019 | Hira et al. |
| 2019/0238429 A1 | 8/2019 | Chanda et al. |
| 2019/0342215 A1 | 11/2019 | Jain et al. |
| 2020/0014638 A1 | 1/2020 | Chen et al. |
| 2020/0036675 A1 | 1/2020 | Tarasuk-Levin |
| 2020/0287964 A1* | 9/2020 | Capper ............... H04L 67/1034 |
| 2020/0296155 A1 | 9/2020 | McGrath et al. |
| 2020/0366741 A1 | 11/2020 | Kancherla et al. |
| 2021/0067378 A1 | 3/2021 | Natarajan et al. |
| 2021/0067413 A1 | 3/2021 | Natarajan et al. |
| 2021/0203688 A1 | 7/2021 | Ghule et al. |
| 2021/0234898 A1 | 7/2021 | Desai et al. |
| 2021/0385155 A1 | 12/2021 | Suryanarayana et al. |

FOREIGN PATENT DOCUMENTS

| | | |
|---|---|---|
| JP | 2003069609 A | 3/2003 |
| JP | 2003124976 A | 4/2003 |
| JP | 2003318949 A | 11/2003 |
| WO | 2005112390 A1 | 11/2005 |
| WO | 2008095010 A1 | 8/2008 |
| WO | 2021040933 A1 | 3/2021 |

OTHER PUBLICATIONS

Dumitriu, Dan Mihai, et al., (U.S. Appl. No. 61/514,990), filed Aug. 4, 2011, 31 pages.

Koponen, Teemu, et al., "Network Virtualization in Multi-tenant Datacenters," Technical Report TR-2013-001E, Aug. 2013, 22 pages, VMware, Inc., Palo Alto, CA, USA.

Non-Published Commonly Owned U.S. Appl. No. 16/573,874, filed Sep. 17, 2019, 37 pages, VMware, Inc.

(56) References Cited

OTHER PUBLICATIONS

Non-Published Commonly Owned U.S. Appl. No. 16/573,906, filed Sep. 17, 2019, 37 pages, VMware, Inc.
Non-Published Commonly Owned U.S. Appl. No. 16/931,196, filed Jul. 16, 2020, 58 pages, VMware, Inc.
Non-Published Commonly Owned U.S. Appl. No. 16/931,207, filed Jul. 16, 2020, 58 pages, VMware, Inc.
Non-Published Commonly Owned U.S. Appl. No. 16/945,746, filed Jul. 31, 2020, 67 pages, Nicira, Inc.
Wang, Anjing, et al., "Network Virtualization: Technologies, Perspectives, and Frontiers," Journal of Lightwave Technology, Feb. 15, 2013, 15 pages, IEEE.
Potter, F. J. M., et al., "The Integration of Ethernet Virtual Private Network in Kubernetes," Nov. 2019, 35 pages, retrieved from https://rp.os3.nl/2019-2020/p58/report.pdf.

\* cited by examiner

POLICY-BASED FORWARDING TO A LOAD BALANCER OF A LOAD BALANCING CLUSTER

BACKGROUND

Today, many server clusters exist in datacenters to provide certain compute or service operations. Examples of these clusters include Webservers, Application Servers, Database Servers, middlebox services (e.g., firewalls, intrusion detection systems, intrusion prevention systems, etc.). Datacenters typically associate each server cluster with a shared virtual IP (VIP) address, and use extensible load balancer clusters to distribute the load across the servers in each cluster by selecting different servers for different data message flows and forwarding the data message flows to the selected servers. To perform their load balancing operations, the load balancers perform a network address translation (NAT) operation to replace the shared VIP address with the address of the selected servers so that the data messages can be forwarded to the severs.

Many stateful load balancers also perform another NAT operation that replaces the source IP address of the data messages from the IP addresses of the client machines that sent the data messages to the IP address of the stateful load balancers to ensure that the return traffic from the servers comes back to the load balancers so that they can perform their stateful services. By performing this other NAT operation, the load balancer hides the client IP address from the servers. However, many servers need to know the client IP addresses in order to perform their operations properly (e.g., for persistent application delivery). As a result of the removed client IP, existing servers and/or supporting infrastructure have developed complex techniques (such as cookie persistence) or use additional header information to support the server operations that need the client IP data.

SUMMARY

Some embodiments of the invention provide a method for forwarding data messages between a client and a server (e.g., between client and server machines and/or applications). In some embodiments, the method receives a data message that a load balancer has directed from a particular client to a particular server after selecting the particular server from a set of several candidate servers for the received data message's flow. The method stores an association between an identifier associated with the load balancer and a flow identifier associated with the message flow, and then forwards the received data message to the particular server.

The method subsequently uses the load balancer identifier in the stored association to forward to the particular load balancer a data message that is sent by the particular server. In some embodiments, the data message that is sent by the particular server is addressed to the particular client. The load balancer in some embodiments is a particular load balancer from a set of two or more load balancers each of which select servers for data message flows from the set of candidate servers. The particular load balancer is selected for the received data message's flow by another network element, e.g., by a front-end load balancer. As further described below, the method in some embodiments is implemented by an intervening forwarding element (e.g., a router) between the load balancer set and the server set.

To store the association between the load balancer identifier and the received message's flow identifier, the method in some embodiments creates and stores an L2 or L3 redirection record (i.e., a record that specifies a layer 2 or 3 redirection) for data messages sent from the particular server to the particular client in response to the received data message. For instance, the L2 redirection record of some embodiments is a policy-based routing (PBR) record that stores a MAC address of the particular load balancer as the load balancer identifier. The method in some of these embodiments replaces the destination MAC address of the data message sent by the particular server with the MAC address of the particular load balancer.

In other embodiments, the redirection record is an L3-redirection PBR record that identifies a tunnel (e.g., stores a tunnel identifier that identifies the tunnel) to a device implementing the particular load balancer (e.g., to a load-balancing appliance or to a host executing the load balancer). In these embodiments, the method uses the tunnel identifier to identify a tunnel to forward the data message sent by the particular server to the particular load balancer.

As mentioned above, the method in some embodiments is performed by an intervening forwarding element between the load balancer set and the server set. This intervening forwarding element in some embodiments is a router that executes on a host computer along with the particular server, while in other embodiments it is a router outside of this host computer. In some embodiments, the intervening forwarding element redirects the data message sent by the particular server (e.g., sent by the particular server to the default gateway) to the load balancer specified in the L2 or L3 redirection record that the intervening forwarding element previously created for the connection between the particular client and particular server.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary, as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for forwarding data messages between clients and servers (e.g., between client and server machines and/or applications). In some embodiments, the method receives a data message that a load balancer has directed from a particular client to a particular server after selecting the particular server from a set of candidate servers for a message flow of the received data message. The method stores an association between an identifier associated with the load balancer and a flow identifier associated with the message flow, and then forwards the received data message to the particular server. The method subsequently uses the load balancer identifier in the stored association to forward to the particular load balancer a data message that the particular server sends to the particular client.

As used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references, respectively, to the second data link layer, the third network layer, the fourth transport layer, and the seventh application layer of the OSI (Open System Interconnection) layer model.

Figure 1:
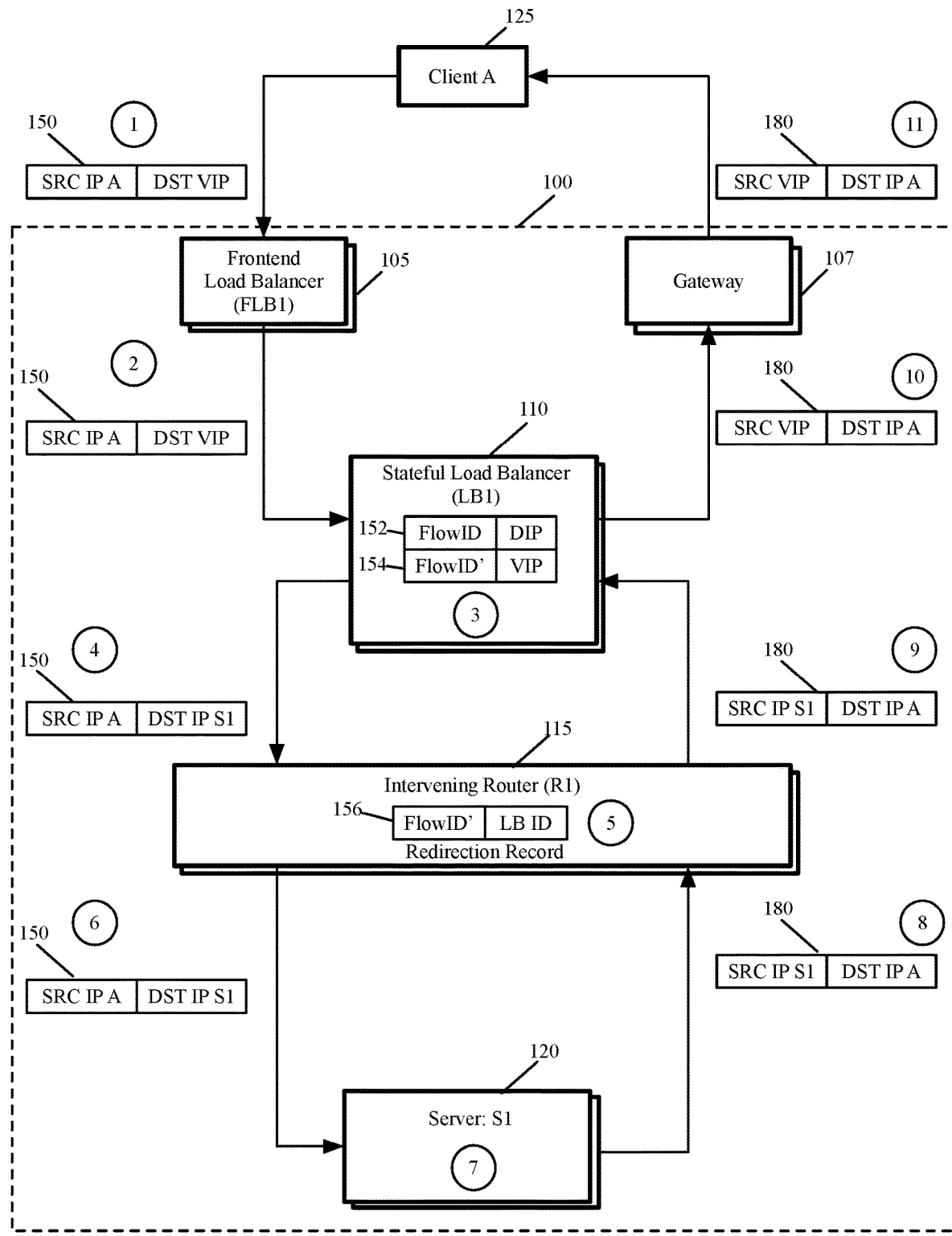
FIG. 1 illustrates an example of a network that implements the method of some embodiments of the invention.

FIG. 1 illustrates an example of a network 100 that implements the method of some embodiments of the invention. In this example, the network 100 includes a set of front-end load balancers 105, a set of gateways 107, a set of stateful load balancers 110, a set of intervening routers 115, and a set of server machines 120. The server set 120 receives data messages 150 from a set of client machines 125. In this example, the client machines 125 reside outside of the network. However, in some embodiments, the client machines 125 can reside in the same network as the server machines 120.

In some embodiments, the network 100 is a virtual private cloud that is implemented in a datacenter to segregate one set of machines in the datacenter from other machines in the datacenter, e.g., one tenant's machines from other tenant machines or one department's machines from other departments machines, etc. In some embodiments, the virtual private cloud is implemented as a logical overlay network, which is established by configuring shared forwarding and middlebox elements (e.g., shared hardware and/or software routers, switches and middlebox services) to implement logical forwarding and middlebox elements. One logical forwarding element (e.g., one logical router or switch) in some embodiments is implemented by multiple physical forwarding elements (e.g., multiple hardware or software routers or switches) and spans multiple physical devices, such as multiple standalone hardware routers or switches, and/or multiple host computers that execute the software routers or switches.

The example presented in FIG. 1 illustrates the processing of a first data message 150 of a data message flow sent by a client machine A in the client machine set 125 to the server set 120. The header of this data message 150 specifies the IP address of client machine A as its source IP address, while specifying the virtual IP address (VIP) of the server set 120 as its destination IP address.

As shown, the front-end load balancer FLB1 105 receives this data message 150, selects stateful load balancer LB1 from the stateful load balancer set 110 for this data message's flow, and forwards the received data message 150 to load balancer LB1. In some embodiments, this front-end load balancer FLB1 105 selects the stateful load balancer LB1 by generating a hash value of the flow identifier (e.g., five tuple identifier) of the received data message 150, and mapping this hash value to the load balancer LB1 (e.g., by using a mapping table that maps different ranges of hash values to different stateful load balancers 110). The front-end load balancer is a stateless load balancer in some embodiments that does not create a connection-tracking record for the received data message's flow, but rather regenerates the hash value for each received message to map each message to its flow's associated stateful load balancer.

The stateful load balancers 110 use a set of load balancing criteria to select server machines 120 for different data message flows from the client machines 125. Weight values are examples of load balancing criteria that are used in some embodiments. In some embodiments, the load balancer uses weight values to implement a weighted round robin scheme to spread the data message flows among the servers. As one example, assume that there are five servers 120 and the weight values for the servers are 1, 3, 1, 3, and 2. Based on these values, a stateful load balancer would distribute data messages that are part of ten new flows such as follows: 1 to the first server, 3 to the second server, 1 to the third server, 3 to the fourth server, and 2 to the fifth server. The load balancer would follow a similar distribution scheme for each subsequent set of ten data message flows.

After receiving the data message 150, the load balancer LB1 uses its load balancing criteria to select the server S1 from the server set 120 for the received data message's flow. The load balancer LB1 then replaces the server set's VIP address in the destination IP field in the data message's header with the destination IP (DIP) address of the selected server S1, and forwards the data message 150 along the network 100 for forwarding to the server S1.

In addition to replacing the VIP address with the DIP address, the load balancer also replaces the source MAC address of the data message 150 with its own source MAC address in some embodiments. However, the load balancer LB1 does not change the source IP address of the data message 150. This is because the server S1 needs to be able to identify client A (from the source IP address) in order to perform its operation.

The load balancer LB1 also creates two connection-tracking records 152 and 154 in its connection-tracking storage (not shown) for the data message flow. The first connection tracking record 152 is for data messages in the same flow as the received data message 150, while the second connection tracking record 154 is for the data messages in the reverse flow from the server S1 to the client A.

The forward connection-tracking record 152 associates the forwarding flow's identifier (e.g., the five-tuple identifier) with the DIP of the server S1 that the load balancer LB1 selected for the flow of the received data message 150. The reverse connection tracking record 152 associates the reverse flow's identifier (e.g., the five-tuple identifier of the flow from server S1 to the client A) with the VIP of the server set 120. As further described below, the load balancer LB1 uses the reverse connection-tracking record for replacing the source IP address of the data messages in the reverse flow that it receives from the server S1 to the VIP address. Instead of creating and using two connection-tracking records, the load balancer LB1 in some embodiments creates only one connection-tracking record for both the forward and reverse flows and simply uses different fields in the created tracking record for performing its matching and data retrieval operations.

An intervening router R1 receives the data message 150 that the load balancer LB1 has directed to the server S1 after selecting this server from the set of candidate servers 120 for the received data message's flow. This intervening router R1 is part of a collection of intervening routers (115) that are configured to implement some embodiments of the invention. These intervening routers (115) are implemented differently in different embodiments. In some embodiments, these intervening routers (115) are software routing instances executing on the same host computers as the servers of the server set 120. In other embodiments, these routers (115) are standalone hardware routers. In still other embodiments, the intervening routers (115) are gateway software or hardware routers at the edge of the network 100. Several examples of different types of routers (115) will be further described below by reference to FIGS. 5 and 6.

The intervening router R1 defines an association between an identifier of the load balancer LB1 and a flow identifier associated with the flow of the received data message 150, and then forwards the received data message 150 to the particular server. In the example illustrated in FIG. 1, the router R1 defines this association by creating a redirection record 156 that associates the identifier of the load balancer LB1 with the flow identifier of the reverse flow from the server S1 to the client A.

The router R1 creates this record so that it can subsequently use the load balancer identifier stored in this record to redirect (i.e., to forward) to the load balancer LB1 the data messages that the server S1 sends back to the client A in response to the flow of the received data message 150. The load balancer LB1 needs to receive the data messages of the reverse flow as it is a stateful load balancer that needs to process the data messages of the forward flow and the reverse flow. FIG. 1 illustrates the forwarding of a data message 180 that the server S1 sends to the client A, first from the intervening router R1 to the load balancer LB1, and then from the load balancer LB1 to the client A through the gateway 107 and an external network (not shown).

Figure 2:
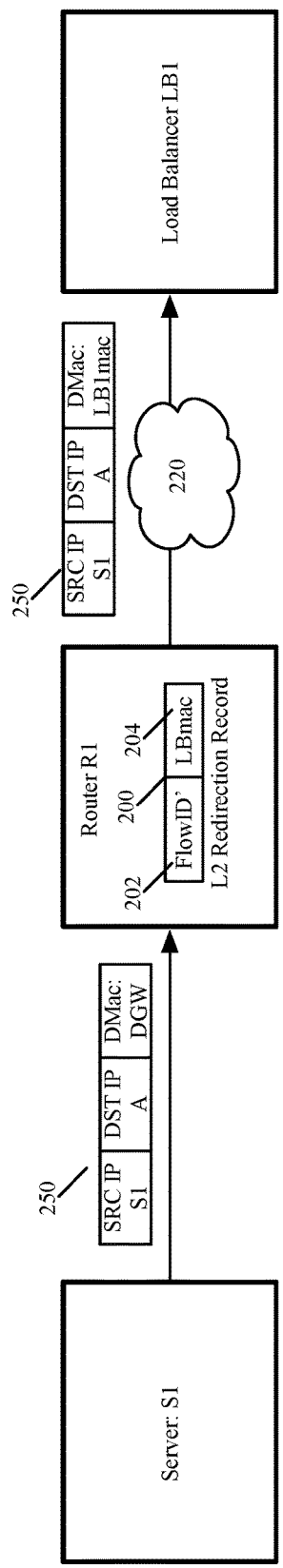
FIGS. 2 and 3 illustrate examples of L2 and L3 redirection records of some embodiments.

The intervening router R1 creates different redirection records 156 in different embodiments. For instance, in some embodiments, the router R1 creates an L2 redirection record, while in other embodiments it creates an L3 redirection record. FIG. 2 illustrates an example of the router R1 using an L2 redirection record 200 in some embodiments to redirect to the load balancer LB1 a data message 250 that the server S1 sends back to the client A in response to the flow of the received data message 150.

As shown, the redirection record 200 is a policy-based routing (PBR) record that associates the MAC address 204 of the load balancer LB1 with an identifier 202 of the reverse flow from the server S1 to the client A. The router R1 creates this record based on the source MAC address of the data message 150 that it receives from the load balancer. The router R1 matches the flow identifier of the data messages in the reverse flow with the flow identifier 202 stored in the redirection record 200, and then replaces the destination MAC address of the data messages in the reverse flow with the LB1's MAC address 204 stored in the redirection record 200.

With this new MAC address 204, the reverse flow data messages will be forwarded to the load balancer LB1 through intervening network fabric 220. In some embodiments, the reverse flow data messages are forwarded from the device that implements the router R1 to the device that implements load balancer LB1 through a tunnel. In these embodiments, the router R1 and the load balancer LB1 are part of a logical overlay network that is established through the use of tunnels between devices that execute the machines, forwarding elements, and middlebox elements of the logical overlay network.

Figure 3:
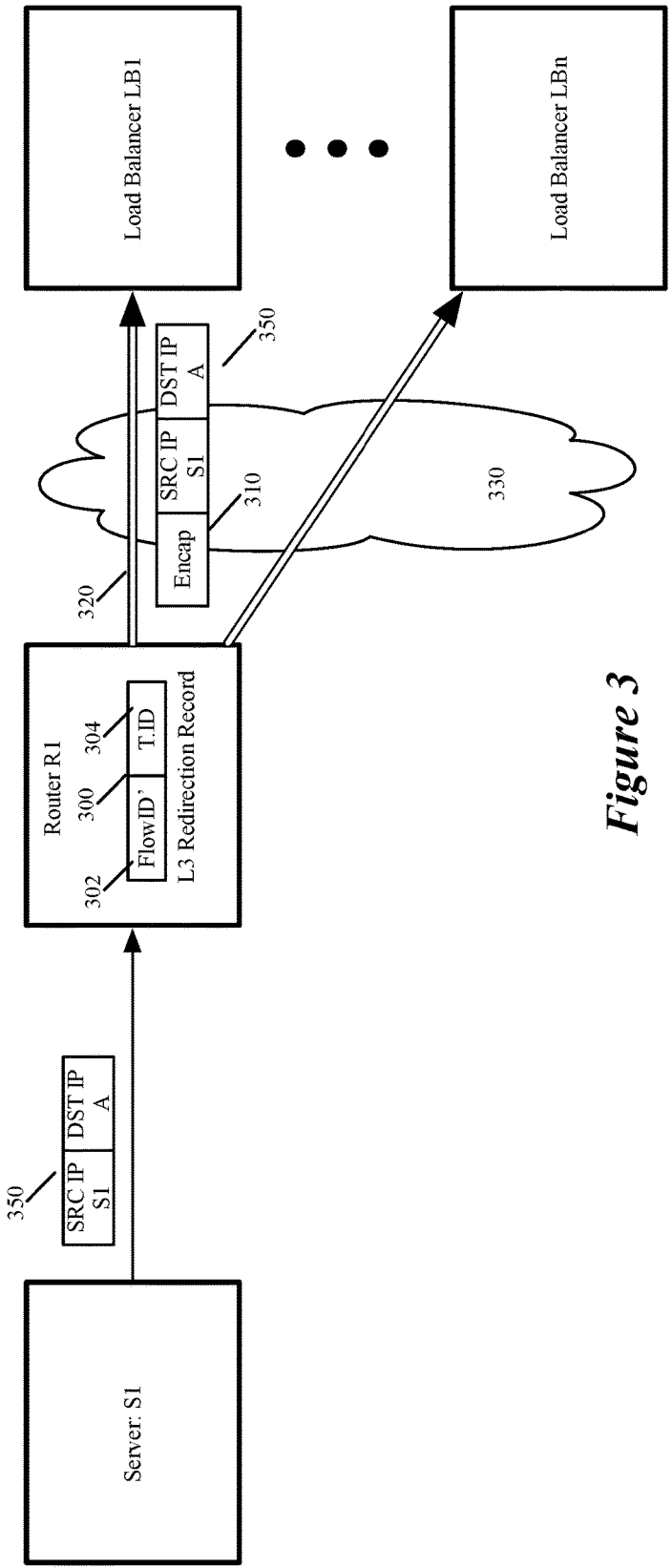

FIG. 3 illustrates an example of the router R1 using an L3 PBR redirection record 300 in some embodiments to redirect to the load balancer LB1 a data message 350 that the server S1 sends back to the client A in response to the flow of the received data message 150. This L3 PBR record 300 associates the flow identifier 302 of the reverse flow (from the server S1 to the client A) with an identifier 304 of a tunnel between the router R1 and the load balancer LB1. The router R1 creates this L3 redirection record 300 in the embodiments in which there is a tunnel between the device implementing the router (e.g., the host computer executing the router R1) and the device implementing the load balancer LB1 (e.g., the host computer executing the load balancer LB1 or the appliance that serves as the load balancer LB1).

The router R1 creates the L3 redirection record 300 when it receives the data message 150 from the load balancer LB1 through a tunnel. The router R1 matches the flow identifier of the data messages in the reverse flow with the flow identifier 302 stored in the redirection record 300, and then identifies a tunnel 320 to use based on the tunnel identifier 304 stored in the record 300. As shown, the identified tunnel 320 is one of several tunnels between the router R1 and several load balancers in the stateful load balancer cluster 110.

After identifying the tunnel 320 for a data message of the reverse flow, the router R1 encapsulates the data message with a tunnel header that stores the source and destination attributes associated with the identified tunnel 320, and then forwards the encapsulated data message to the load balancer LB1 along this tunnel 320 (e.g., performs another lookup based on the tunnel identifier 304 to identify the interface through which the data message has to exit the router). With its encapsulating tunnel header 310, the reverse flow data message is forwarded to the load balancer LB1 through intervening network fabric 330.

Figure 4:
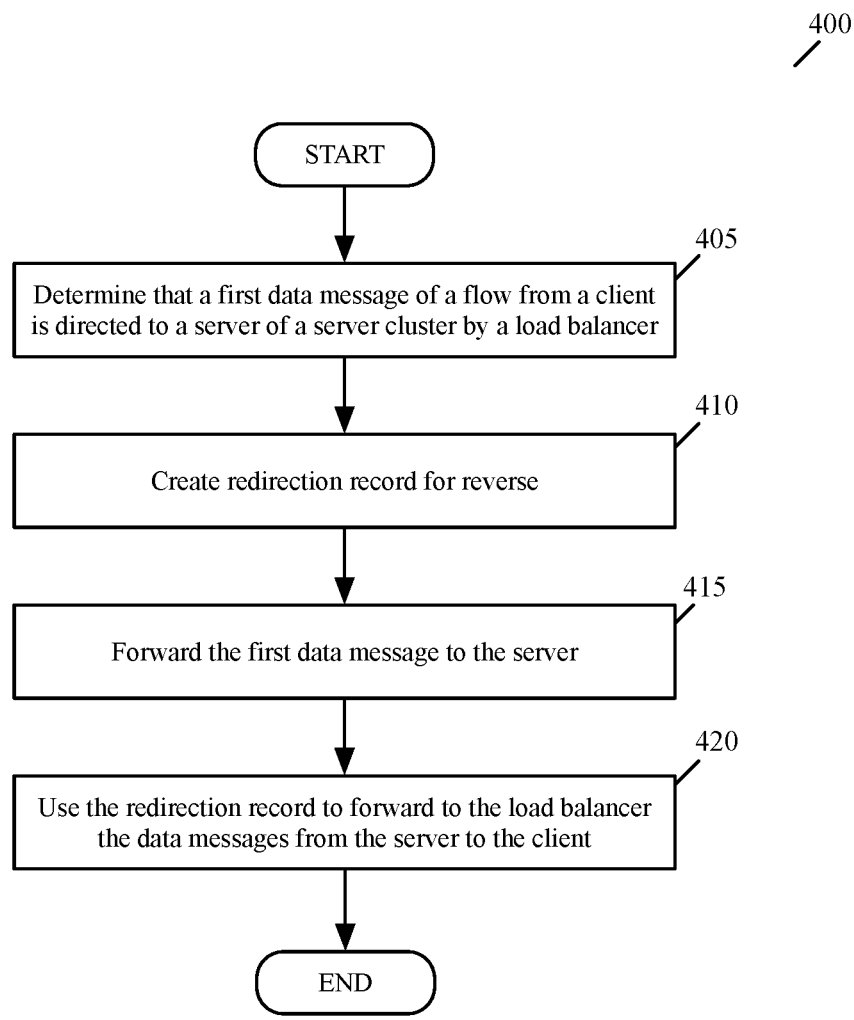
FIG. 4 illustrates a process that an intervening router (e.g., router R1) performs to create a redirection record for a data message flow from a client to a server that the router receives from a load balancer, so that it can use this redirection record to forward back to the load balancer the reverse flow from the server to the client.

FIG. 4 illustrates a process 400 that an intervening router (e.g., router R1) performs to create a redirection record for a data message flow from a client to a server. The intervening router receives the redirection record from a load balancer (e.g., load balancer LB1), so that it can use this redirection record to forward back to the load balancer the reverse flow from the server to the client. The process 400 starts when it receives the first data message of the data message flow from the client to the server. The intervening router receives this data message after a load balancer has selected the server for the data message flow from a cluster of several servers.

As shown, the process initially determines (at 405) that the data message is directed to a server of a server cluster by a load balancer. In some embodiments, the process 400 makes this determination by matching the received data message's destination attributes with one of its policies that is defined for the server addressed by the data message.

Next, at 410, the process 400 creates a redirection record that associates the load balancer that selected the server for the flow with the identifier of the flow or the reverse flow. As illustrated by FIG. 2, the redirection record in some embodiments is an L2 redirection record 200 that stores the MAC address 204 of the load balancer that selected the server along with the identifier 202 of the reverse flow from the client to the server. Alternatively, as illustrated by FIG. 3, the redirection record in some embodiments is an L3 redirection record 300 that stores the identifier 304 of the tunnel through which the first data message is received from the load balancer that selected the server. This record 300 stores the tunnel identifier 304 along with the identifier 302 of the reverse flow from the client to the server.

At 415, the process 400 forwards the first data message to the server addressed by the destination IP address. Next, at 420, the process 400 uses its redirection record to forward to the server-selecting load balancer associated with the forward data message flow, the data messages of the reverse flow from the server to the client. When the redirection record is an L2 redirection record (such as record 200), the process 400 in some embodiments replaces the destination MAC address of the data message sent by the server with the MAC address of the particular load balancer. Alternatively, when the redirection record is an L3 redirection record (such as record 300), the process 400 identifies the tunnel to the load balancer from the redirection record, encapsulates the data messages of the reverse flow with tunnel headers that store the source and destination attributes associated with the identified tunnel, and then forwards the encapsulated data messages to the load balancer associated with this tunnel.

Figure 5:
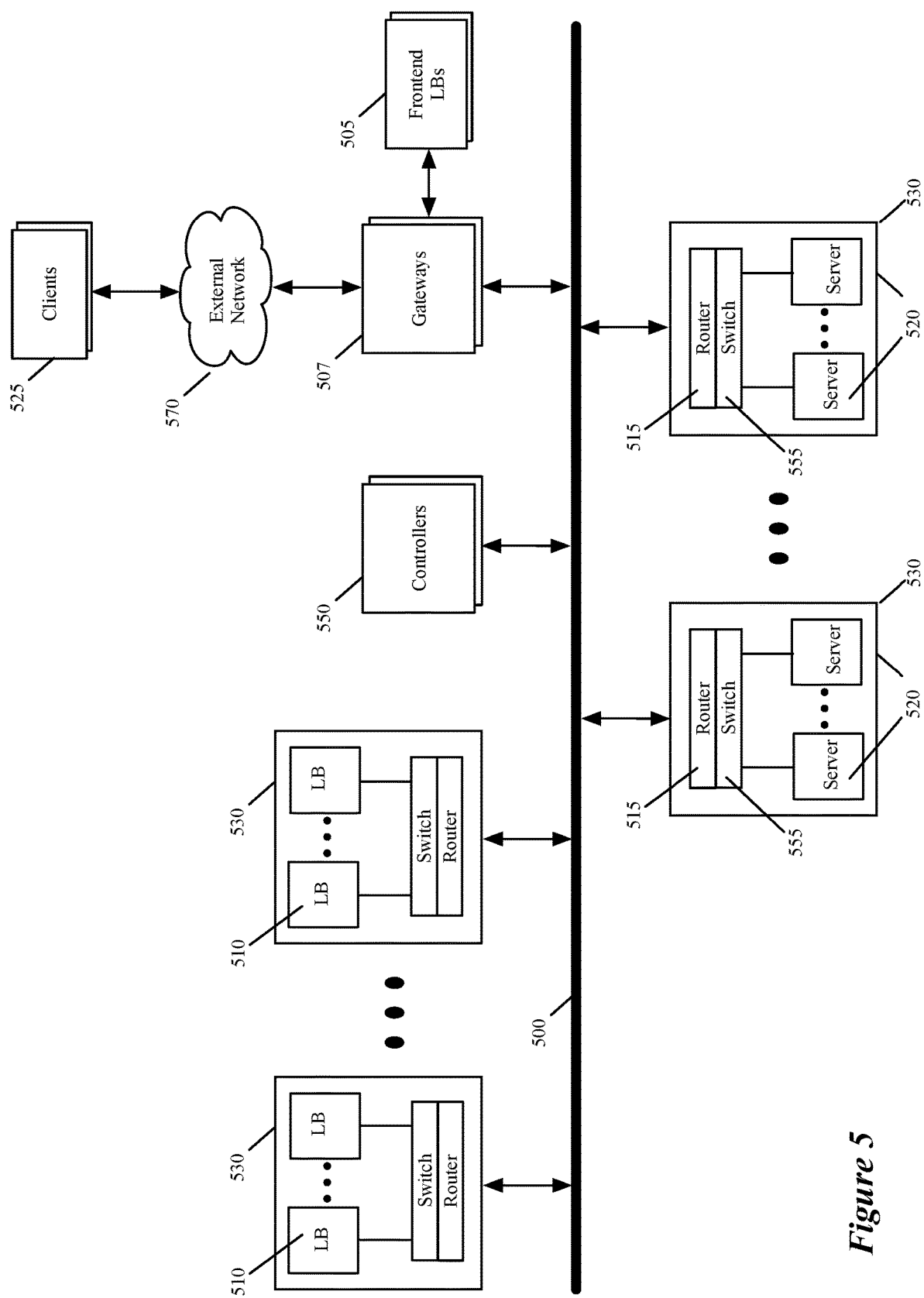
FIG. 5 illustrates one example of how some embodiments deploy the load balancers in the load balancer cluster, the servers in the server cluster, and the redirecting, intervening routers of a network of a datacenter.

FIG. 5 illustrates one example of how some embodiments deploy the load balancers in the stateful load balancer cluster 110, the servers in the server cluster 120, and the redirecting intervening routers 115 of a network 500 of a datacenter. Specifically, this example shows the load balancers 510 and servers 520 deployed as machines (e.g., VMs or containers) executing on host computers 530. In FIG. 5, the load balancers 510 are shown to execute on different host computers 530 than the servers 520, but the load balancing machines 510 in some embodiments can execute on the same host computers as the servers 520.

The redirecting intervening routers 115 in this example are the managed software routers 515 executing on the host computers 530 on which the servers 520 execute. These routers 515 are configured by a set of controllers 550 to forward data messages received from the load balancers 510 to the servers 520 executing on their host computers 530 through software managed switches 555 executing on the host computers.

The routers 515 are also configured by the controller set 550 (1) to create L2 or L3 redirection records for new data message flows that they receive for their respective servers from the load balancers 510, and (2) to use these redirection records to forward the reverse flows that the servers 520 send in response to the received flow back to the load balancers that selected the servers. When multiple servers 520 of the server cluster 120 execute on a host computer 530, the managed software router 515 on the host computer 530 performs this operation for these servers 520.

In some embodiments, the controller set 550 configures multiple managed software routers 515 executing on multiple host computers 530 to implement a logical router that spans the host computers 530. When the network 500 supports multi-tenancy, the controller set 550 configures the managed software routers 515 executing on the host computers 530 to implement different logical routers for different tenants, with each logical router spanning one or more host computers 530.

Similarly, the controller set 550 in some embodiments configures multiple managed software switches 555 executing on multiple host computers 530 as a logical router that spans the host computers 530. The controller set 550 in some embodiments also configures the load balancers 510 with load balancing criteria and forwarding rules for selecting servers 520 in the server cluster 120 for different message flows and for forwarding the data message flows to the servers 520. The load balancers 510 receive the data message flows from the front-end load balancers 505 which forward data messages flows that they receive from the gateways 507 that serve as the edge forwarding elements between the datacenter's network and an external network 570. In this example, the client machines 525 that send the data messages to the server cluster's VIP address, and that receive the reverse flow from the servers in this cluster, are in the external network 570.

Figure 6:
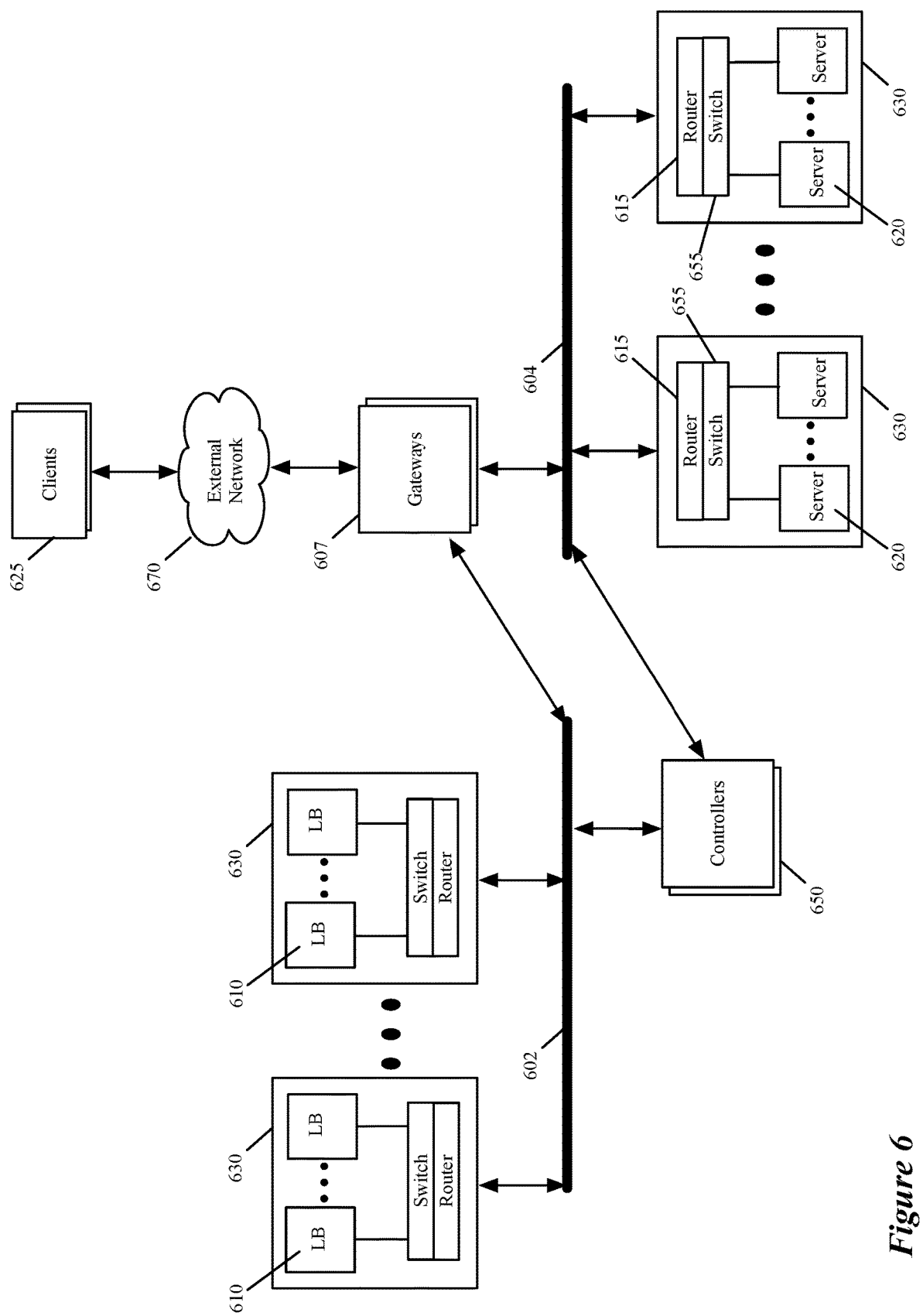
FIG. 6 illustrates an example of the load balancers being in a different network segment than the servers in a datacenter network.

In the example illustrated in FIG. 5, the load balancers 510 are in the same network segment as the servers 520. FIG. 6 illustrates an example of the load balancers 610 being in a different network segment than the servers 620 in a datacenter network. In FIG. 6, the load balancers 610 are in a network segment 602, while the servers are in network segment 604. Both of these segments are accessible through the gateway cluster 607. The gateways in this cluster 607 serve as the front-end load balancers that forward data message flows to the load balancers 610. These gateways 607 in some embodiments also serve as the intervening routers that create and use the redirection records for the reverse flows from the servers 620 to the client 625 outside of the datacenter network.

The controller set 650 configures the gateways 607 to select the load balancers 610 for the data message flows, and to create and use the redirection records. In some embodiments, the servers 620 or routers 615 that execute on the same host computers 630 as the servers 620 are configured to forward the reverse flows from the servers 620 to the gateways 607 (e.g., acting as the default gateways of the subnets of the servers). In this manner, the gateways 607 (1) receive the reverse flows from the servers 620 to the clients 625, (2) redirect these flows to the load balancers 610 that selected the servers for the associated forward flows, and then (3) forward these flows to the clients 625 through the external network 670.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
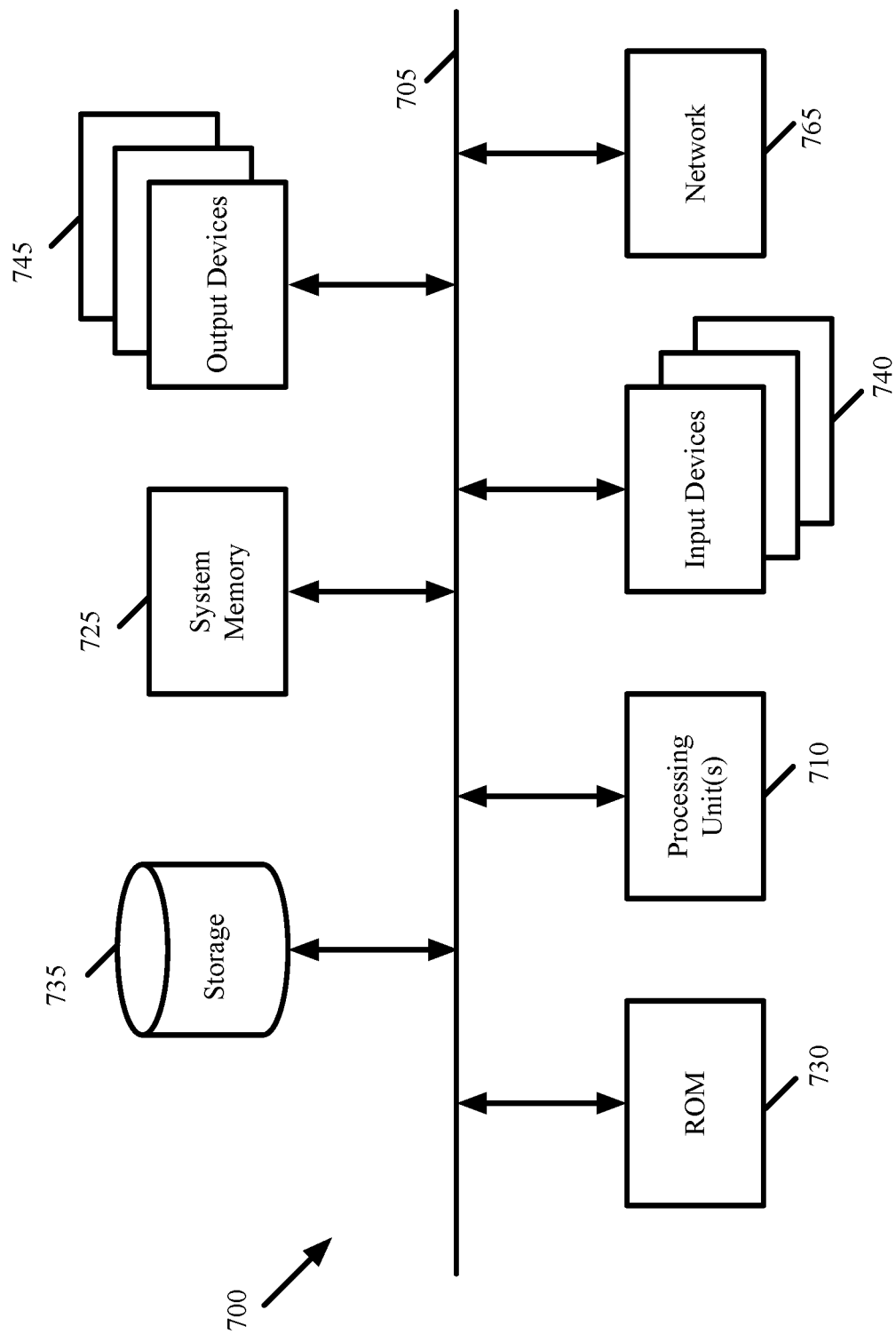
FIG. 7 conceptually illustrates a computer system with which some embodiments of the invention are implemented.

FIG. 7 conceptually illustrates a computer system 700 with which some embodiments of the invention are implemented. The computer system 700 can be used to implement any of the above-described hosts, controllers, forwarding elements (e.g., routers) and middlebox elements (e.g., load balancers). As such, it can be used to execute any of the above-described processes. This computer system includes various types of non-transitory machine readable media and interfaces for various other types of machine readable media. Computer system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the computer system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments. The read-only-memory (ROM) 730 stores static data and instructions that are needed by the processing unit(s) 710 and other modules of the computer system. The permanent storage device 735, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such as random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices 740 enable the user to communicate information and select requests to the computer system. The input devices 740 include alphanumeric keyboards and pointing devices (also called "cursor control devices"). The output devices 745 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 7, bus 705 also couples computer system 700 to a network 765 through a network adapter (not shown). In this manner, the computer can be a part of a network of computers (such as a local area network ("LAN"), a wide area network ("WAN"), or an Intranet), or a network of networks (such as the Internet). Any or all components of computer system 700 may be used in conjunction with the invention.

Some embodiments include electronic components, such as microprocessors, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for forwarding data messages between a client and a server, the method comprising:
at an intervening router:
receiving a first data message that a load balancer has directed from a particular client to a particular server after selecting the particular server from a plurality of candidate servers for a message flow of the received first data message, wherein the load balancer is a particular load balancer selected from a plurality of load balancers by a front-end load balancer;
after receiving the first data message from load balancer, creating and storing a record associating a load balancer identifier associated with the particular load balancer and a flow identifier identifying the message flow, said record for subsequent use in identifying the particular load balancer from the plurality of load balancers as the destination of a responsive second data message from the particular server;
forwarding the data message to the particular server; and
using the load balancer identifier in the stored association to forward to the particular load balancer the responsive second data message that is sent by the particular server.

2. The method of claim 1, wherein the data message that is sent by the particular server is sent back to the particular client.

3. The method of claim 1, wherein the plurality of load balancers select servers for message flows received by the load balancers from clients of the servers.

4. The method of claim 3, wherein the received data message is a first data message of the message flow, and the particular load balancer receives the first data message from a network element that selects, for the message flow, the particular load balancer from the plurality of load balancers.

5. The method of claim 1, wherein the record specifies a layer 2 redirection of data messages sent from the particular server to the particular client.

6. The method of claim 5, wherein the record is a policy-based routing record.

7. The method of claim 5, wherein the record stores a MAC address of the load balancer as the load balancer identifier, and using the load balancer identifier comprises replacing the destination MAC address of the data message sent by the particular server with the MAC address of the particular load balancer.

8. The method of claim 1, wherein the record is a policy-based routing record that specifies a layer 3 redirection of data messages sent from the particular server to the particular client.

9. The method of claim 8, wherein the record stores the load balancer identifier, which comprises a tunnel identifier that identifies a tunnel to a device implementing the load balancer, and using the load balancer identifier comprises using the tunnel identifier to identify the tunnel to use to forward the data message sent by the particular server to the load balancer.

10. The method of claim 1, wherein
the received data message is a first data message and the data message sent by the particular server is the second data message;
the particular server forwards the second data message to a gateway as the particular server; and
the intervening router receives the second data message and redirects the second data message to the particular load balancer.

11. The method of claim 10, wherein the intervening router executes on a host computer along with the particular server.

12. The method of claim 10, wherein the intervening router is outside of a host computer on which the particular server executes.

13. The method of claim 10, wherein the intervening router is the gateway, and the gateway is at a north/south boundary of a network that comprises the particular load balancer and the plurality of candidate servers.

14. The method of claim 10, wherein the gateway is a default gateway.

15. The method of claim 1, wherein
the received data message is a first data message and the data message sent by the particular server is the second data message; and
the load balancer processes the second data message and forwards the processed second data message back to the particular client.

16. The method of claim 1, wherein:
the message flow is a first message flow; and
the record associates the identifier of the particular load balancer with a flow identifier of a second message flow that is a reverse flow of the first message flow.

17. A non-transitory machine readable medium storing a router program for execution by at least one processing unit of a host computer to forward data messages between a client and a server, the router program comprising sets of instructions for:
receiving a data message that a load balancer has directed from a particular client to a particular server after selecting the particular server from the plurality of candidate servers for a message flow of the received data message, wherein the load balancer is a particular load balancer selected from a plurality of load balancers by a front-end load balancer;
after receiving the first data message from load balancer, creating and storing a policy-based routing (PBR) record to associate a load balancer identifier associated with the particular load balancer and a flow identifier identifying the message flow;
forwarding the received data message to the particular server;
using the PBR record to map a flow identifier of a data message that is sent by the particular server to the load balancer identifier in order to identify the particular load balancer; and
forwarding the sent data message to the identified particular load balancer.

18. The non-transitory machine readable medium of claim 17, wherein the data message that is sent by the particular server is sent back to the particular client.

19. The non-transitory machine readable medium of claim 17, wherein
the plurality of load balancers that select servers for message flows received by the load balancers from clients of the servers,
the received data message is a first data message of the message flow, and
the particular load balancer receives the first data message from a network element that selects, for the message flow, the particular load balancer from the plurality of load balancers.

20. The non-transitory machine readable medium of claim 17, wherein the policy-based routing record specifies a layer 3 redirection of data messages sent from the particular server to the particular client.

* * * * *